G. Keating,
Miter Box.

Nº 57,334.   Patented Aug. 21, 1866.

Witnesses.
Jas. A. Service

Inventor.
Geo. Keating
per Munn & Co
Attorneys

UNITED STATES PATENT OFFICE.

GEORGE KEATING, OF THOMASTON, MAINE.

IMPROVEMENT IN MITER-BOXES.

Specification forming part of Letters Patent No. 57,334, dated August 21, 1866.

*To all whom it may concern:*

Be it known that I, GEORGE KEATING, of Thomaston, in the county of Knox and State of Maine, have invented a new and useful Improvement in Miter-Boxes; and I do hereby declare that the following is a full, clear, and exact description thereof, which will enable others skilled in the art to make and use the same, reference being had to the accompanying drawings, forming part of this specification, in which—

Figure 1:
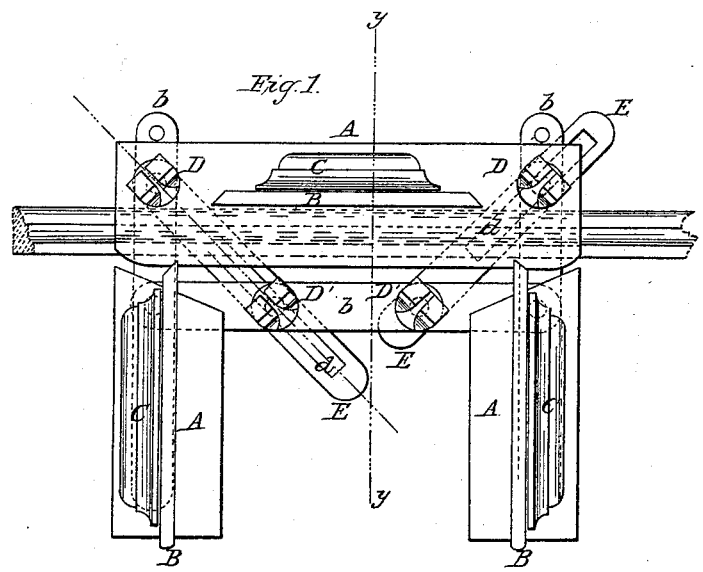
Figure 2:
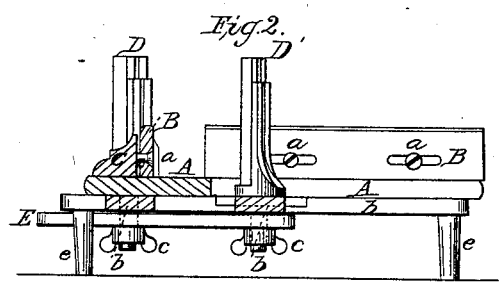

Figure 1 is a plan. Fig. 2 is a section on the line $y\,y$.

Similar letters of reference indicate like parts.

The design of my invention is to supply a miter-box which may be set at any obtuse and acute angles for sawing beveled work or moldings for frames of rhomboidal form, enabling the workman to saw all the four corners of a frame one after another on the same box at the proper angles for coming together and fitting perfectly. It is also adapted to sawing angles of forty-five degrees for square work. It is easily adjusted and works with great accuracy.

To enable others skilled in the art to understand my invention, I will proceed to describe the same.

A A A are tables or benches on which the moldings are laid for sawing. B B B are movable rests to support the square side of the moldings. These rests are fastened to fixed blocks C C C on the top of the benches by screws $a\,a\,a$, which pass through longitudinal slots in B B B, and may be shifted to suit different-sized moldings.

D D D′ D′ are four saw-guides, two of which, D D, pass through the table at the head of the miter-box down to a four-sided parallel adjustable frame, $b\,b\,b\,b$, on the under side. (Indicated partly through the upper part in Fig. 1 by dotted lines.) They are pivoted in both the bench A and the frame $b\,b$. The other two saw-guides, D′ D′, are pivoted on the inside bar of the frame $b\,b$. The guides D D D′ D′ all pass through two sliding bars, E E, placed under the frame $b\,b\,b\,b$, to which they are attached by set-screws $c\,c$, Fig. 2, on their ends. The sliding bars E E have slots $d\,d$, Fig. 1, at one end of each, one of the slots being at the end of one bar, to receive the set-screw of one of the saw-guides D, and the other at the end of the other bar, to receive the set-screw of one of the saw-guides D′. $e\,e\,e\,e$ are four legs at the corners of the box.

When the miter-box is needed to saw square work the movable tables A A are set square to the table at the head of the box, each of the saw-guides D D then being at angles of forty-five degrees, and all the work is done on one table; but when beveled work is required for making rhomboidal frames, the movable tables are shifted to any desired angle which the figure requires by means of the adjustable frame $b\,b\,b\,b$ and the sliding bars E E, which shift the saw-guides in their relations to the direction of the molding-rests B B accordingly. The set-screws $c\,c\,c\,c$ hold the adjustable frame $b\,b\,b\,b$ and the sliding bars E E in place for the work, either square or beveling. The saw-guides will then cut the miter of the four corners in succession.

The molding for the beveled work is laid on the table at the head of the box, and beginning to saw off at one of the guides, the work is continued all around, moving the molding from one table to the other in order, from left to right, until the four corners of a frame are cut to fit and form the required figure.

Having thus described my invention, what I claim as new, and desire to secure by Letters Patent, is—

An adjustable miter-box for sawing beveled work or miters for rhomboidal figures of any desired angles, constructed and arranged substantially as herein described.

GEORGE KEATING.

Witnesses:
THOS. O'BRIEN,
J. C. SIMONDS.